United States Patent [19]

Hamilton

[11] Patent Number: 4,539,774
[45] Date of Patent: Sep. 10, 1985

[54] RODENT EXTERMINATOR

[75] Inventor: Lyman L. Hamilton, Burney, Calif.

[73] Assignees: Alice Hamilton Guest, Kenwood; Robert Lyman Hamilton, Burney; Neil Wesley Hamilton, Rohnert Park, all of Calif.

[21] Appl. No.: 595,426

[22] Filed: Mar. 30, 1984

[51] Int. Cl.³ .............................................. A01M 27/00
[52] U.S. Cl. ................................................ 43/80; 43/6; 43/84; 124/34; 124/54
[58] Field of Search ................... 43/6, 5, 77, 78, 79, 43/80, 84, 58; 124/54, 60, 1, 55, 34, 32, 77, 61

[56] References Cited

U.S. PATENT DOCUMENTS

| | | |
|---|---|---|
| 237,942 | 2/1881 | Woolsey ........................... 43/84 |
| 898,023 | 9/1908 | Wheeler ........................... 43/84 |
| 1,167,178 | 1/1916 | Hill ................................. 124/61 |
| 1,188,756 | 6/1916 | Gentry ............................. 43/84 |
| 1,464,861 | 8/1923 | Armstrong ....................... 43/84 |
| 1,517,085 | 11/1924 | Martinek ......................... 43/84 |
| 2,717,466 | 9/1955 | Andre ............................... 43/6 |
| 2,729,017 | 1/1956 | Mealey ............................. 43/84 |
| 2,888,768 | 6/1959 | Taylor .............................. 43/6 |
| 2,900,972 | 8/1959 | Marsh ............................... 43/6 |
| 2,909,464 | 10/1957 | Sutton ............................. 43/84 |

Primary Examiner—Gene P. Crosby
Attorney, Agent, or Firm—Leonard D. Schappert

[57] ABSTRACT

A rodent exterminator triggered by the presence of a rodent in close proximity thereto having a spear attached thereto which impales the rodent, killing it instantly.

4 Claims, 6 Drawing Figures

RODENT EXTERMINATOR

BACKGROUND OF THE INVENTION

1. Field of the Invention

The present invention relates generally to devices designed to exterminate animals, and more specifically to devices designed to exterminate rodents such as gophers or other tunneling animals.

2. Description of the Prior Art

In the past, inventors have directed their efforts toward designing and developing trap guns or gopher guns. These have taken several forms, but the common denominators have included a trigger mechanism tripped by the animal and a cartridge or blasting capability set off by the trigger mechanism. In some cases, these devices have included a projectile launched by the blast. While previously designed devices may have some of the features of the present invention, none of the prior art of which applicant is aware combines the unique trigger mechanism of the present invention with a spear which is attached to the device so that it never completely leaves the barrel of the device.

SUMMARY OF THE INVENTION

The present invention consists of a rodent exterminator which includes a body having means for inserting a cartridge therein, a trigger and hammer mechanism for firing the cartridge, a microswitch triggered by the presence of a rodent, and a barrel with a spear movably set therein and permanently attached thereto, so that, when the cartridge is fired, the spear moves laterally through the barrel, impaling the rodent. For purposes of safety, the spear is permanently attached to a piston in the barrel of the device which prevents it from leaving the barrel. If the cartridge is fired accidentally, this safety feature greatly reduces the risk and/or extent of possible injury to persons in the vicinity of the device.

The primary object of the present invention is to provide a rodent exterminator which kills rodents quickly and effectively, yet which contains features which render it less likely to cause severe damage to an individual's hand or foot if the device should be triggered accidentally.

Another object of the present invention is to provide a rodent exterminator which is triggered by the presence of a rodent in the target area.

A further object of the present invention is to provide a rodent exterminator which is relatively inexpensive to build and relatively maintenance-free.

A further object of the present invention is to provide a rodent exterminator which, because of its unique construction, leaves less mess to deal with after the extermination is complete.

The foregoing objects, as well as other objects and benefits of the present invention, are made more apparent by the descriptions and claims which follow.

DESCRIPTION OF THE PREFERRED EMBODIMENT

Figure 1:
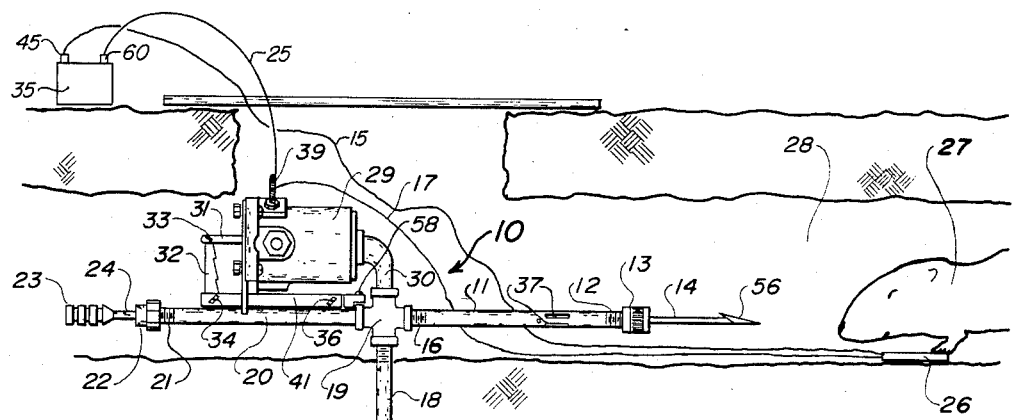
FIG. 1 is a side view of the rodent exterminator showing the device in place in a gopher hole.
Figure 2:
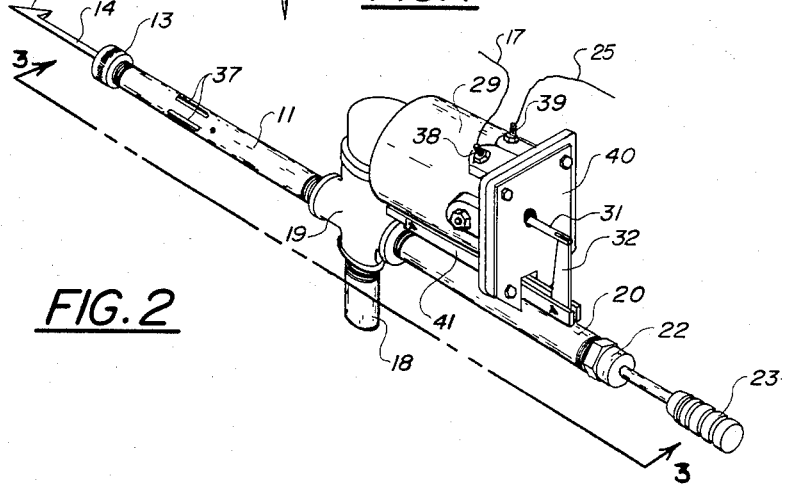
FIG. 2 is a perspective view of the rodent exterminator showing specific features of the device in greater detail.
Figure 3:
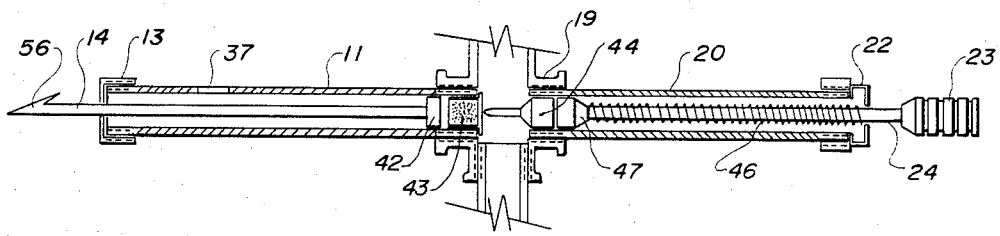
FIG. 3 is a cross-sectional view of the rodent exterminator taken along lines 3—3 of FIG. 2.
Figure 6:
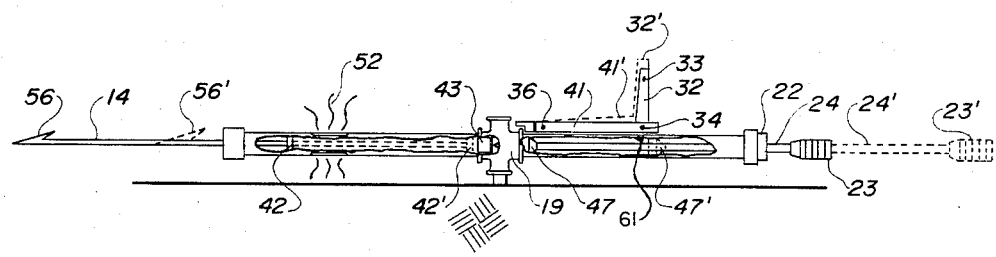
FIG. 6 is a side view of the rodent exterminator shown in FIGS. 1, 2 and 3, with appropriate cutaways showing its operation.

FIG. 1 of the drawings shows the rodent exterminator 10 positioned in gopher hole 28. FIGS. 2, 3 and 6 show specific details necessary to an understanding of the operation of rodent exterminator 10.

The basic structure of rodent exterminator 10 consists of a four-way female pipe fitting 19 with tube 20, solenoid mount 30, barrel 11 and spike 18 threaded therein as shown. Rodent exterminator 10 is held rigidly in position with respect to the ground and to the rodent hole 28 by spike 18, which is driven into the ground as shown. The cocking and firing mechanism employed consists of solenoid 29, battery 35, microswitch 26 and the associated wiring, and tube 20 and the associated parts thereof. The operator cocks rodent exterminator 10 by pulling handle 23 outward from threaded bearing 22, thereby compressing spring 46 between plunger 47 and threaded bearing 22. Plunger 47 is held in a cocked position by spike 61 of plate 32. Plate 32 pivots with respect to rod 41 on pins 34 and 36, and rod 41 pivots with respect to tube 20 on pin 36. Rod 24 joins handle 23 to plunger 47. When solenoid 29 is activated, it moves rod 31 laterally into solenoid 29. As rod 31 moves into solenoid 29, spike 61 is pulled upward, releasing plunger 47. The tension on spring 46 propels plunger 47 through tube 20 until it strikes firing pin 44, which in turn detonates cartridge 43. When cartridge 43 is detonated, the explosive gases thereby created react on plunger 42, forcing plunger 42 laterally through barrel 11 toward threaded bearing 13. The pressure created by the ignition of cartridge 43 continues to act on plunger 42 until plunger 42 approaches gas vents 37. When plunger 42 reaches gas vents 37, the pressure created by the gases is released through gas vents 37 and, when plunger 42 has passed gas vents 37, a back-pressure develops in barrel 11 between plunger 42 and threaded bearing 13, immediately stopping and reversing the movement of plunger 42.

The operator can easily remove barrel 11 by simply unscrewing at threads 16; this provides for easy removal of spent cartridge 43. Spear 14, plunger 42 and threaded bearing 13, as well as the inside of barrel 11, can be inspected after threaded bearing 13 is unscrewed from barrel 11 at threads 12. The condition of threaded bearing 22, rod 24, spring 46 and plunger 47, as well as the inside of tube 20, can be inspected after threaded bearing 22 is unscrewed from tube 20 at threads 21.

In operation, the operator positions rodent exterminator 10 in rodent hole 28 by driving spike 18 into the ground. In the arming process, rod 24 and handle 23 are pulled back into the position shown as 24' and 23' in FIG. 6 of the drawings. As handle 23 is pulled back, spike 61 is pushed upward, and as plunger 47 reaches the position shown as 47' in FIG. 6, spike 61 slips downward to hold plunger 47 in place. The movement of plate 32 and rod 41 is shown by the positions designated 32' and 41' in FIG. 6 of the drawings. As the rodent 27 approaches rodent exterminator 10 and touches microswitch 26, microswitch 26 closes momentarily, completing a circuit through electrical lines 15, 17 and 25 between terminals 45 and 60 of battery 35, and between terminals 38 and 39 of solenoid 29. After closing momentarily, microswitch 26 re-opens, thereby protecting battery 35 from total discharge. When the abovedescribed circuit is completed, solenoid 29 is activated and rod 31 moves laterally into solenoid 29. As rod 31 moves laterally into solenoid 29, it pulls plate 32 upward as a result of the pivoting action of rod 41. When plate 32 moves upward, spike 61 releases plunger 47 and, due to the tension on spring 46, plunger 47 moves laterally through tube 20 until it strikes firing pin 44. When firing pin 44 is impacted, it strikes cartridge 43, detonating it. The pressure created by the ignition of cartridge 43 forces plunger 42 from its position, shown as 42' in FIG. 6, laterally through barrel 11 toward threaded bearing 13. The impalement of rodent 27 by point 56 of spear 14 is immediate. As plunger 42 passes gas vents 37 of barrel 11 and back-pressure builds between plunger 42 and threaded bearing 13, the movement of point 56 and spear 14 is reversed, so that point 56 becomes solidly lodged in rodent 27. Because rodents normally run with their heads down, point 56 lodges in the area of the brain, between the eyes, killing rodent 27 instantly.

Figure 4:
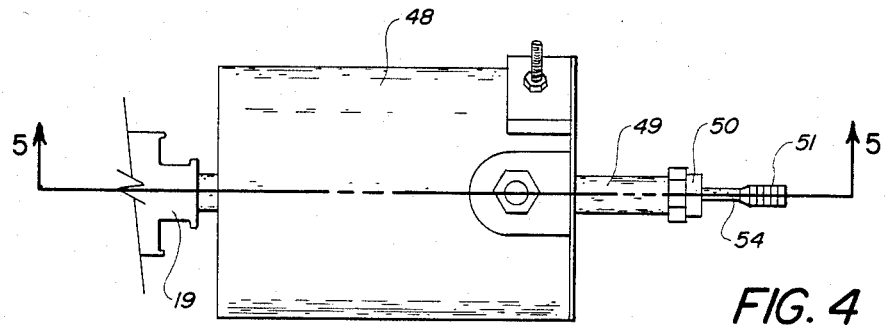
FIG. 4 is a top view of an alternative trigger mechanism for use with the device.
Figure 5:
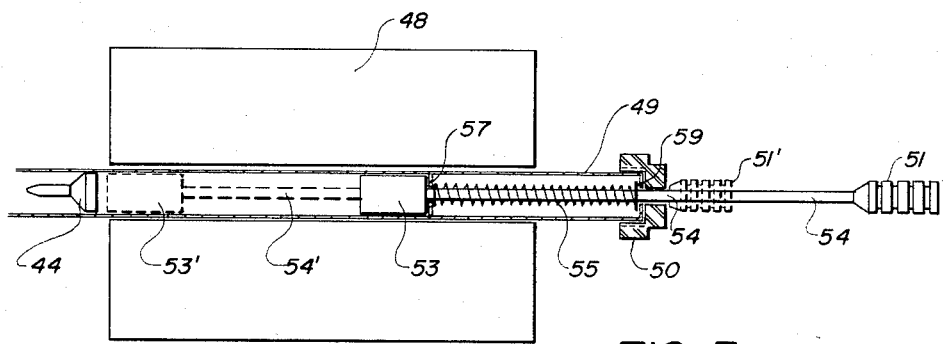
FIG. 5 is a cutaway view of the alternative trigger mechanism, shown in FIG. 4, taken along lines 5—5 of FIG. 4.

An alternative method of firing rodent exterminator 10 is shown in FIGS. 4 and 5 of the drawings, FIG. 4 being a top view showing placement of an alternative solenoid 48 with a tube 49 comparable to tube 20 running through the center thereof. In this embodiment, the normal position of rod 54 and handle 51 is shown in solid lines. Rod 54 and handle 51, as well as plunger 53, are normally held in this position by spring 55. Spring 55 extends between snap ring 59, which is rigidly attached to rod 54, and snap ring 57, which is rigidly attached to tube 49. As a result of the tension on spring 55, plunger 53 is normally held away from firing pin 44, and the likelihood of misfiring is thereby reduced. However, when solenoid 48 is activated as previously discussed, plunger 53, which is magnetic, moves laterally toward firing pin 44, striking firing pin 44 and firing rodent exterminator 10. In the activated position, plunger 53 is shown as 53', rod 54 is shown as 54', and handle 51 is shown as 51'. During activation, spring 55 is compressed between snap rings 57 and 59 so that, immediately after solenoid 48 is deactivated, plunger 53, rod 54 and handle 51 return to their original positions, shown by the solid lines in FIG. 5. Threaded bearing 50 is positioned to support and contain the workings of the alternative firing mechanism for rodent exterminator 10.

While the foregoing description of the invention has shown preferred embodiments using specific terms, such description is for illustrative purposes only. It is applicant's intention that changes and variations may be made without departure from the spirit or scope of the following claims, and this disclosure is not intended to limit applicant's protection in any way.

I claim:

1. A rodent exterminator, comprising:
    a hollow barrel having:
        receptacle means at one end wherein an explosive cartridge is placed;
        bearing means having a hole therein at the end opposite said receptacle means, and
        holes in the periphery of said hollow barrel located nearer to said bearing means than to said recepotacle means;
    plunger means positioned inside said hollow barrel and slidable therein between said receptacle means and said bearing means;
    a spear attached to said plunger means and extending through said hole in said bearing means whereby a rodent is impaled by said spear when said cartridge is detonated, and
    detonating means for detonating said cartridge including firing pin means and trigger means activated by the presence of a rodent in close proximity to said spear.

2. The invention of claim 1, wherein said holes in said periphery of said barrel are positioned so that, when said plunger means is propelled past said holes toward said bearing means by detonation of said explosive cartridge, a back pressure develops in said barrel between said bearing means and said plunger means whereby said spear and said plunger means stop and reverse direction.

3. The invention of claim 1, wherein said trigger means consists substantially of:
    spring-loaded hammer means;
    locking means for holding said spring-loaded hammer means in a cocked position;
    an electrical locking means release mechanism consisting of a solenoid attached to said locking means;
    a switch electrically connected to said solenoid, and
    a power supply connected to said switch and said solenoid so that, when said switch is closed, said solenoid activates, disengaging said locking means and detonating said explosive cartridge.

4. The invention of claim 2, wherein said trigger means consists substantially of:
    spring-loaded hammer means;
    locking means for holding said spring-loaded hammer means in a cocked position;
    an electrical locking means release mechanism consisting of a solenoid attached to said locking means;
    a switch electrically connected to said solenoid, and
    a power supply connected to said switch and said solenoid so that, when said switch is closed, said solenoid activates, disengaging said locking means and detonating said explosive cartridge.

* * * * *